Aug. 26, 1930.                H. WACH                1,774,116
                    RECIPROCATING ENGINE AND TURBINE
                         Filed Sept. 15, 1926
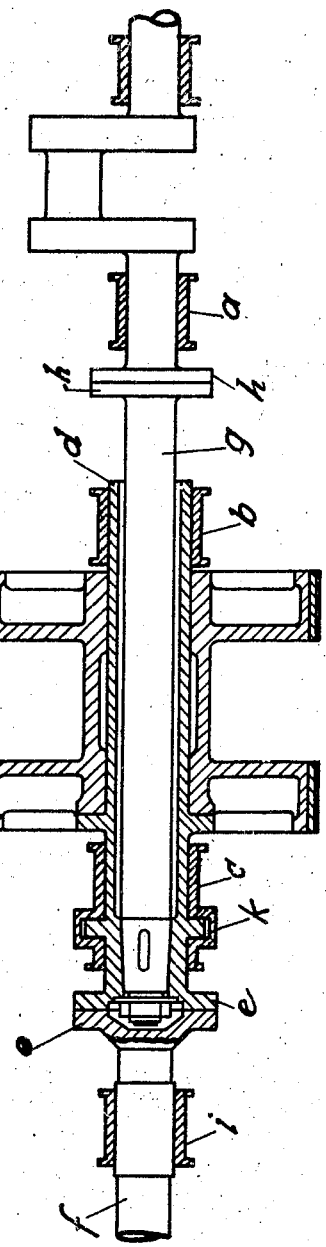
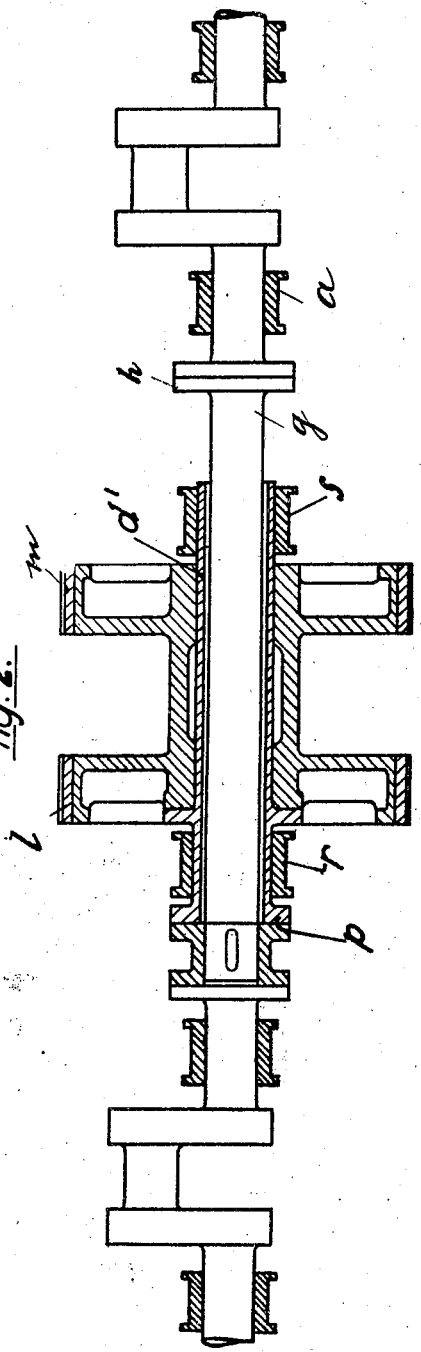
Inventor:
Hans Wach Patented Aug. 26, 1930

1,774,116

UNITED STATES PATENT OFFICE

HANS WACH, OF WESERMUNDE-LEHE, GERMANY

RECIPROCATING ENGINE AND TURBINE

Application filed September 15, 1926, Serial No. 135,656, and in Germany March 8, 1926.

My invention relates to a reciprocating engine and more particularly to a combined reciprocating engine and turbine both acting on the same shaft wherein the crank shaft, or a prolongation thereof, of the reciprocating engine is connected through a transmission gear to another shaft either for imparting additional power to it or for receiving power therefrom.

In such a case it is of great importance that the gear wheels turn truly, as otherwise they do not mesh accurately.

As is well-known, the crank shaft of a reciprocating engine may easily get slightly out of true alignment.

In an arrangement of this type, according to the present invention, the bearing for the gear wheel is such that it remains unaffected by any deviation or distortion of the crank shaft.

According to one embodiment of the invention there is keyed on a prolongation of the crank shaft beyond its end bearing a hollow shaft journalled in a bearing and connected to a second shaft, the said hollow shaft carrying the transmission gear.

The invention is illustrated in the two figures of the accompanying drawing where a shaft is rotated by a combined reciprocating engine and turbine.

According to Fig. 1, $a$ is the end bearing of a crank shaft $g$ of a reciprocating engine, a prolongation thereof, as illustrated, being formed by an intermediate shaft coupled to the crank shaft proper by flanges $h$. $d$ is a hollow shaft keyed to shaft $g$ and rotating in bearings $b$ and $c$. As shown in the drawings hollow shaft $d$ carries two gear wheels $l\ m$ which mesh with gear wheels of a transmission not shown and which latter may be driven, for example, by a turbine, also not shown; $f$ is a driving shaft journalled in a bearing $i$ and connected to hollow shaft $d$ by flanges $e$.

It will be seen that if the bearing $a$ becomes worn, the shaft $g$ may sag but without affecting the bearing of the gear wheels. It is possible that, owing to the elasticity of shaft $g$ bearing $i$ may remain true even when bearing $a$ is a few millimetres out of true alignment. Flanges $e$ are also kept in correct position by bearing $i$ so that should the bearing $a$ become worn, the hollow shaft $g$ will remain in true alignment, and the gear wheels of the transmission will remain properly in mesh which is of great importance.

As illustrated, a thrust bearing $k$ for the hollow shaft $d$ may be also provided which thrust bearing becomes independent of the wear of bearing $a$.

Fig. 2 shows a modification of Fig. 1, wherein the hollow shaft $d'$ carrying the gear wheels $l$, $m$ surrounds the crank shaft and is coupled to it or a prolongation thereof at $p$. If desired, both ends of the hollow shaft $d'$ may be coupled to the crank shaft. The hollow shaft is mounted in bearings $r$ and $s$ independent of the crank shaft.

I claim:

1. In combination with a power shaft and bearings therefor, bearings independent of the bearings of said power shaft, a coaxial hollow shaft journaled in said second mentioned bearings and engaged over said power shaft operatively connected with said power shaft so as to rotate therewith and to allow play of said power shaft, transmission gears mounted on said hollow shaft for transmitting power to or from said hollow shaft and thereby said power shaft, a propeller shaft coaxial with said power shaft and said hollow shaft and connected at one end with one end of said hollow shaft and bearing means for said propeller shaft independent of said first and second mentioned bearings.

2. The combination as specified in claim 1, including a thrust bearing for said hollow shaft.

In testimony whereof I have affixed my signature.

HANS WACH.